US012711575B2

(12) United States Patent
Djelouah et al.

(10) Patent No.: US 12,711,575 B2
(45) Date of Patent: Aug. 18, 2026

(54) TECHNIQUES FOR RESAMPLING IMAGES

(71) Applicants: DISNEY ENTERPRISES, INC., Burbank, CA (US); ETH Zürich (Eidgenössische Technische Hochschule Zürich), Zürich (CH)

(72) Inventors: Abdelaziz Djelouah, Zurich (CH); Michael Yves Bernasconi, Valendas (CH); Farnood Salehi, Zurich (CH); Christopher Richard Schroers, Uster (CH)

(73) Assignees: Disney Enterprises, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 511 days.

(21) Appl. No.: 18/320,496

(22) Filed: May 19, 2023

(65) Prior Publication Data

US 2023/0377093 A1 Nov. 23, 2023

Related U.S. Application Data

(60) Provisional application No. 63/344,472, filed on May 20, 2022.

(51) Int. Cl.
*G06T 3/4046* (2024.01)
*G06T 3/18* (2024.01)
(Continued)

(52) U.S. Cl.
CPC .............. *G06T 3/4046* (2013.01); *G06T 3/18* (2024.01); *G06T 5/60* (2024.01); *G06T 5/73* (2024.01); *G06T 5/80* (2024.01)

(58) Field of Classification Search
CPC ....... G06T 3/4046; G06T 3/4053; G06T 3/18; G06T 3/02; G06T 3/4007; G06T 5/60;
(Continued)

(56) References Cited

U.S. PATENT DOCUMENTS

2021/0049739 A1* 2/2021 Schroers ............... G06T 3/4046

FOREIGN PATENT DOCUMENTS

GB 2475716 A * 6/2011 ............... G06T 5/50

OTHER PUBLICATIONS

Son et al., "SRWarp: Generalized Image Super-Resolution under Arbitrary Transformation", arXiv:2104.10325, Apr. 21, 2021, 17 pages. (Year: 2021).*

(Continued)

*Primary Examiner* — Geoffrey E Summers
(74) *Attorney, Agent, or Firm* — Squire Patton Boggs LLP; Sarah Mirza

(57) ABSTRACT

Techniques are disclosed for resampling images. In some embodiments, a resampling model includes (1) one or more feature extraction layers that extract features from an input image and a degradation map; (2) one or more resampling layers that generate warped features from the extracted features and a warp grid; and (3) one or more prediction layers that generate, from the warped features, an output image or resampling kernels that can be applied to the input image to generate an output image. In some embodiments, the resampling model can be trained by applying degradation maps to output images in a training data set to generate corresponding input images, and training the resampling model using the input images and the corresponding output images.

17 Claims, 9 Drawing Sheets

(51) Int. Cl.
*G06T 5/60* (2024.01)
*G06T 5/73* (2024.01)
*G06T 5/80* (2024.01)

(58) Field of Classification Search
CPC ............. G06T 5/00; G06T 2207/20081; G06T 2207/20084; G06T 5/73; G06T 5/80
See application file for complete search history.

(56) References Cited

OTHER PUBLICATIONS

Bako et al., "Kernel-Predicting Convolutional Networks for Denoising Monte Carlo Renderings", ACM Transactions on Graphics, DOI: http://dx.doi.org/10.1145/3072959.3073708, vol. 36, No. 4, Article 97, Jul. 2017, pp. 97:1-97:14. (Year: 2017).*
Zhang et al., "Learning a Single Convolutional Super-Resolution Network for Multiple Degradations", arXiv:1712.06116, May 24, 2018, 10 pages. (Year: 2018).*
Kim, Soo Ye, Hyeonjun Sim, and Munchurl Kim. "KOALAnet: Blind Super-Resolution using Kernel-Oriented Adaptive Local Adjustment." 2021 IEEE/CVF Conference on Computer Vision and Pattern Recognition (CVPR). IEEE, 2021. (Year: 2021).*
Chen, Zhuo. "An Overview of ESPCN: An Efficient Sub-pixel Convolutional Neural Network." Medium. Apr. 16, 2020. < https://medium.com/@zhuocen93/an-overview-of-espcn-an-efficient-sub-pixel-convolutional-neural-network-b76d0a6c875e>. (Year: 2020).*
Jia, Xu, Hong Chang, and Tinne Tuytelaars. "Super-resolution with deep adaptive image resampling." arXiv preprint arXiv:1712.06463v1 (2017). (Year: 2017).*
Li, Nianyi, et al. "Unsupervised Non-Rigid Image Distortion Removal via Grid Deformation." 2021 IEEE/CVF International Conference on Computer Vision (ICCV). IEEE, 2021. (Year: 2021).*
Bako et al., "Kernel-Predicting Convolutional Networks for Denoising Monte Carlo Renderings", ACM Transactions on Graphics, DOI: http://dx.doi.org/10.1145/3072959.3073708, vol. 36, No. 4, Article 97, Jul. 2017, pp. 97:1-97:14.
Chen et al., "Learning Continuous Image Representation with Local Implicit Image Function", arXiv:2012.09161, Apr. 1, 2021, 11 pages.
Cornillere et al., "Blind Image Super-Resolution with Spatially Variant Degradations", ACM Transactions on Graphics, https://doi.org/10.1145/3355089.3356575, vol. 38, No. 6, Article 166, Nov. 2019, pp. 166:1-166:13.
Dodgson, Neil Anthony, "Image Resampling", Computer Laboratory, Aug. 1992, 264 pages.
Dong et al., "Image Super-Resolution Using Deep Convolutional Networks", arXiv:1501.00092, Jul. 31, 2015, 14 pages.
Fuoli et al., "Fourier Space Losses for Efficient Perceptual Image Super-Resolution", arXiv:2106.00783, Jun. 1, 2021, 14 pages.
Hiu et al., "Meta-SR: A Magnification-Arbitrary Network for Super-Resolution", arXiv:1903.00875, Apr. 3, 2019, 10 pages.
Ledig et al., "Photo-Realistic Single Image Super-Resolution Using a Generative Adversarial-Network", arXiv:1609.04802, May 25, 2017, 19 pages.
Liang et al., "SwinIR: Image Restoration Using Swin Transformer", arXiv:2108.10257, Aug. 23, 2021, 12 pages.
Liang et al., "Hierarchical Conditional Flow: A Unified Framework for Image Super-Resolution and Image Rescaling", arXiv:2108.05301, Aug. 11, 2021, 10 pages.
Liang et al., "Mutual Affine Network for Spatially Variant Kernel Estimationin Blind Image Super-Resolution", arXiv:2108.05302, Aug. 11, 2021, 10 pages.
Magid et al., "Dynamic High-Pass Filtering and Multi-Spectral Attention for Image Super-Resolution", 2021, 10 pages.
Saharia et al., "Image Super-Resolution via Iterative Refinement", arXiv:2104.07636, Jun. 30, 2021, 28 pages.
Shi et al., "Real-Time Single Image and Video Super-Resolution Using an Efficient Sub-Pixel Convolutional Neural Network", arXiv:1609.05158, Sep. 23, 2016, 10 pages.
Son et al., "SRWarp: Generalized Image Super-Resolution under Arbitrary Transformation", arXiv:2104.10325, Apr. 21, 2021, 17 pages.
Wang et al., "Learning A Single Network for Scale-Arbitrary Super-Resolution", arXiv:2004.03791, Jul. 23, 2021, 10 pages.
Wang et al., "A Fully Progressive Approach to Single-Image Super-Resolution", arXiv:1804.02900, Apr. 10, 2018, 10 pages.
Zhang et al., "Learning a Single Convolutional Super-Resolution Network for Multiple Degradations", arXiv:1712.06116, May 24, 2018, 10 pages.
Zhang et al., "Multi-Scale Vision Longformer: A New Vision Transformer for High-Resolution Image Encoding", arXiv:2103.15358, May 27, 2021, 18 pages.
Zhang et al., "Image Super-Resolution Using Very Deep Residual Channel Attention Networks", arXiv:1807.02758, Jul. 12, 2018, 16 pages.
Zhang et al., "Residual Dense Network for Image Super-Resolution", arXiv:1802.08797, Mar. 27, 2018, 10 pages.
Zwicker et al., "EWA Splatting", IEEE Transactions On Visualization And Computer Graphics, vol. 8, No. 3, Jul.-Sep. 2002, pp. 223-238.
Kingma et al., "Adam: A Method For Stochastic Optimization", ICLR 2015, arXiv:1412.6980, Jan. 17, 2015, 13 pages.
Paszke et al., "PyTorch: An Imperative Style, High-Performance Deep Learning Library", 33rd Conference on Neural Information Processing Systems, arXiv:1912.01703, Dec. 3, 2019, 12 pages.

* cited by examiner

TECHNIQUES FOR RESAMPLING IMAGES

CROSS-REFERENCE TO RELATED APPLICATIONS

This application claims priority benefit of the United States Provisional Patent Application titled, "TECHNIQUES FOR RESAMPLING IMAGES," filed on May 20, 2022, and having Ser. No. 63/344,472. The subject matter of this related application is hereby incorporated herein by reference.

BACKGROUND

Technical Field

Embodiments of the present disclosure relate generally to computer science and computer graphics and, more specifically, to techniques for resampling images.

Description of the Related Art

Image resampling is the process of geometrically transforming digital images. Examples of image resampling include upscaling an image to a higher resolution image and/or applying a transformation operation on the image, such as affine transform (e.g., translation, scaling, reflection, rotation, shearing, or the like) or a lensing or delensing transform that increases or decreases a spherical warping of the image. Many image processing techniques involve image resampling.

One conventional approach for resampling involves determining, for each of the pixels of an input image, corresponding pixels of an output image. For example, a 64-pixel-square input image can be linearly interpolated to distribute the channel values of each single pixel over a 2×2 region in order to produce a 128-pixel-square upsampled output image. One drawback of such an approach for resampling images is that the input image is sequentially processed through multiple different operations, which can introduce or amplify visual artifacts in the output image. As a result, the output image can have relatively poor overall visual quality.

As the foregoing illustrates, what is needed in the art are more effective techniques for resampling images.

SUMMARY

One embodiment of the present disclosure sets forth a computer-implemented method for resampling images. The method includes extracting one or more features from an input image and a degradation map. The method further includes determining, based on the one or more features and a warp grid that maps one or more coordinates of one or more pixels in an output image to one or more corresponding coordinates in the input image, one or more warped features. In addition, the method includes generating at least one of the output image or one or more resampling kernels based on the one or more warped features.

Another embodiment of the present disclosure sets forth a computer-implemented method for training a machine learning model to resample images. The method includes generating one or more warped images based on one or more images and one or more degradation maps. The method further includes performing one or more operations to train the resampling model based on the one or more images and the one or more warped images.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is the disclosed techniques can generate resampled images having better overall visual quality than resampled images that can be generated using conventional resampling techniques. In addition, the disclosed techniques can generate resampling kernels that can be used to resample data types other than the data types used to train a resampling model. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, can be had by reference to embodiments, some of which are illustrated in the appended drawings. It is to be noted, however, that the appended drawings illustrate only typical embodiments of this disclosure and are therefore not to be considered limiting of its scope, for the disclosure can admit to other equally effective embodiments.

DETAILED DESCRIPTION

In the following description, numerous specific details are set forth to provide a more thorough understanding of the present invention. However, it will be apparent to one of skill in the art that embodiments of the present invention can be practiced without one or more of these specific details.

System Overview

Figure 1:
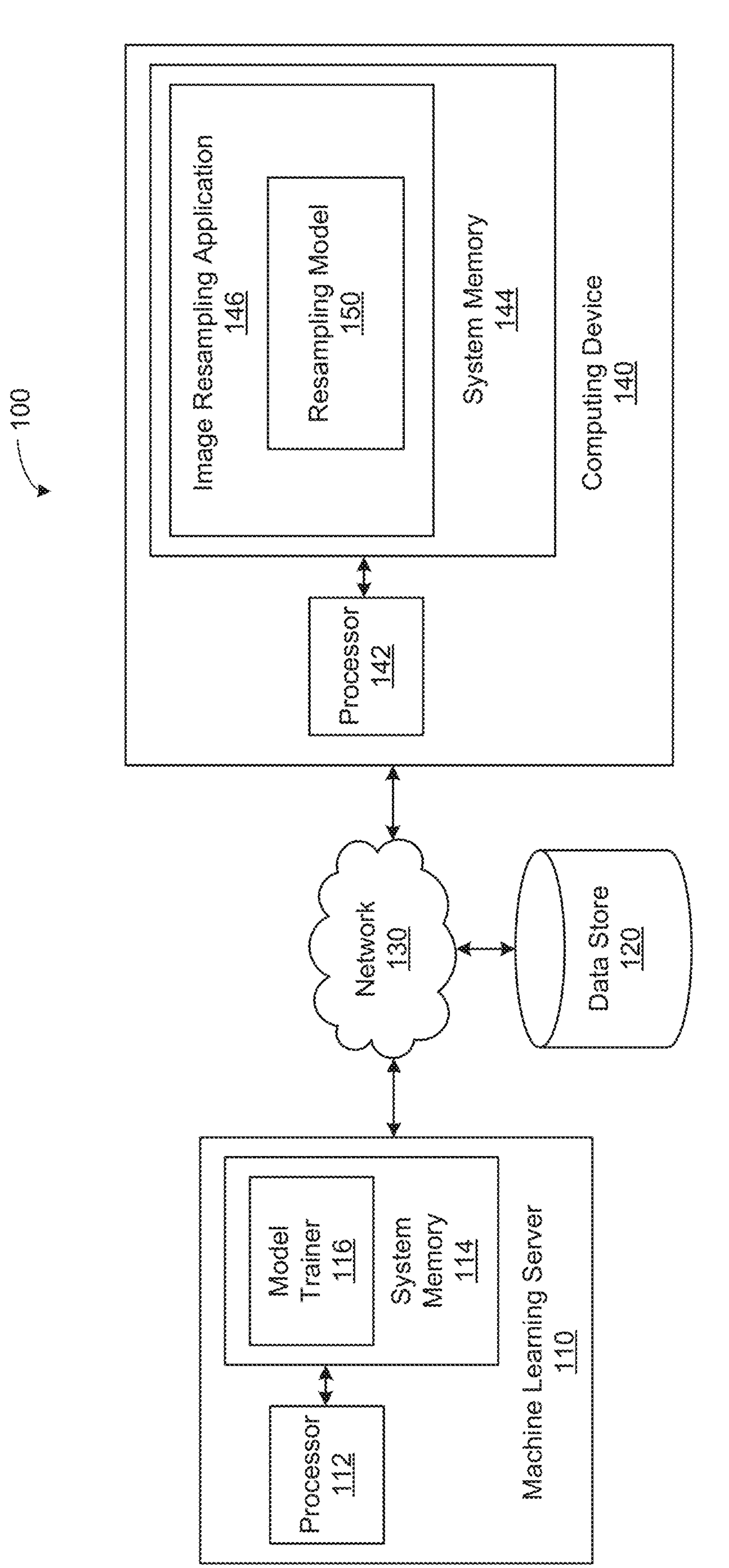
FIG. 1 illustrates a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which can be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard, a mouse, a joystick, a touchscreen, or a microphone. In operation, the processor 112 is the master processor of the machine learning server 110, controlling and coordinating operations of other system components. In particular, the processor 112 can issue commands that control the operation of a graphics processing unit (GPU) (not shown) that incorporates circuitry optimized for graphics and video processing, including, for example, video output circuitry. The GPU can deliver pixels to a display device that can be any conventional cathode ray tube, liquid crystal display, light-emitting diode display, or the like.

The system memory 114 of the machine learning server 110 stores content, such as software applications and data, for use by the processor 112 and the GPU. The system memory 114 can be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 can be modified as desired. Further, the connection topology between the various units in FIG. 1 can be modified as desired. In some embodiments, any combination of the processor 112, the system memory 114, and a GPU can be replaced with any type of virtual computing system, distributed computing system, or cloud computing environment, such as a public, private, or a hybrid cloud.

In some embodiments, the model trainer 116 is configured to train one or more machine learning models, including a resampling model 150. In some embodiments, the resampling model 150 is an artificial neural network that takes as inputs an image and a degradation map and that outputs either a resampled image or a resampling kernel that can be applied to the input image to generate a resampled image. An exemplar architecture of the resampling model 150, and techniques for training the same, are discussed in greater detail below in conjunction with FIGS. 2-4 and 7-8. Training data and/or trained machine learning models, including the resampling model 150, can be stored in the data store 120. In some embodiments, the data store 120 can include any storage device or devices, such as fixed disc drive(s), flash drive(s), optical storage, network attached storage (NAS), and/or a storage area-network (SAN). Although shown as accessible over the network 130, in some embodiments the machine learning server 110 can include the data store 120.

Once trained, the resampling model 150 can be deployed for use in resampling images. Illustratively, an image resampling application 146 that utilizes the resampling model 150 is stored in a system memory 144, and executes on a processor 142, of the computing device 140. In some embodiments, components of the computing device 140, including the system memory 144 and the processor 142 can be similar to corresponding components of the machine learning server 110.

It will be appreciated that the system 100 shown herein is illustrative and that variations and modifications are possible. For example, the number of machine learning servers and computing devices can be modified as desired. Further, the functionality included in any of the applications can be divided across any number of applications or other software that are stored and executed via any number of computing systems that are located in any number of physical locations.

Image Resampling Using Neural Networks

Figure 2:
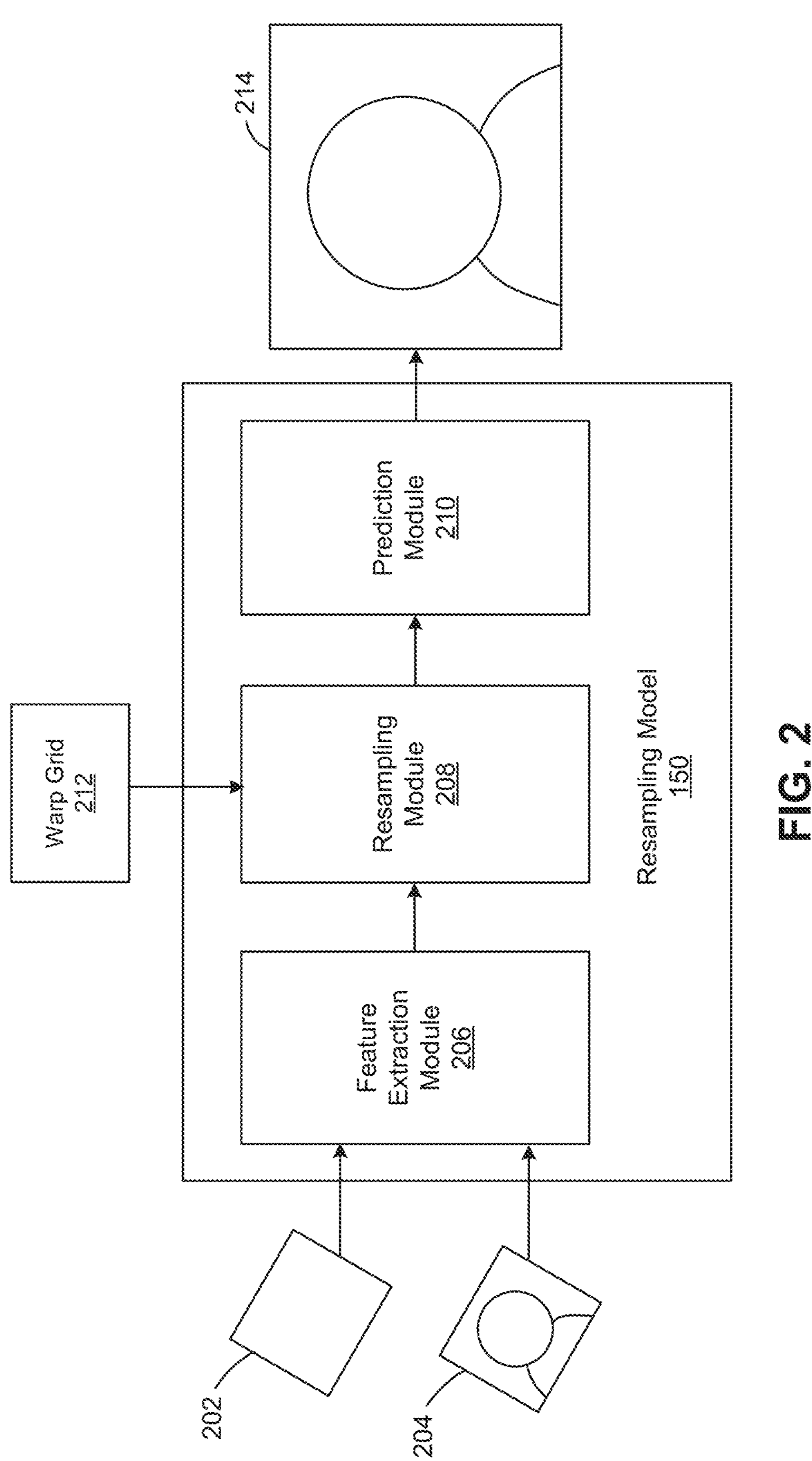
FIG. 2 illustrates in greater detail the resampling model of FIG. 1, according to various embodiments.

FIG. 2 illustrates in greater detail the resampling model 150 of FIG. 1, according to various embodiments. As shown, the resampling model 150 is a machine learning model that includes a feature extraction module 206, a resampling module 208, and a prediction module 210. Illustratively, the resampling model 150 takes as inputs an image 204, a degradation map 202, and a warp grid 212. Given such inputs, the resampling model 150 generates an output image 214 that is a resampled version of the input image 204.

The image 204 is warped relative to the output image 214 that the resampling model 150 generates. The degradation map 202 indicates how the input image 204 has been warped, which can include a resolution change and/or a geometric transform. Examples of warpings include global transformations, such as upscaling or rotation, and locally varying transformations, such as lens distortion or undistortion. In some embodiments, the degradation map 202 is spatially varying and includes, for each pixel of the input image 204, a kernel representing how blurred the input image 204 is giving the resolution change and/or geometric transform associated with the warp. The image resampling application 146 can generate the degradation map 202 in any technically feasible manner, including using known techniques, in some embodiments. For example, in some embodiments, the image resampling application 146 can apply a trained machine learning model, such as a trained artificial neural network, in an optimization procedure that generates the degradation map 202. In such cases, the machine learning model can be trained to recognize artifacts created by degradation maps, and the optimization procedure can use the trained machine learning model to determine a degradation map that produces relatively sharp images without creating artifacts as discussed in greater detail below.

More formally, the goal of resampling is to warp an image using a given mapping (or warp) W that maps coordinates in the image to coordinates in an output image. In some embodiments, the mapping increases the sampling rate (e.g., super-resolution). Given the input image I, a discrete output image I' can be computed as:

$$I' = \mathcal{K}_A * f_{I'}, \tag{1}$$

$$= \mathcal{K}_A * (f_I \circ W) \tag{2}$$

$$= \mathcal{K}_A * ((\mathcal{K}_R * I) \circ W), \tag{3}$$

where $\mathcal{K}_R$ is a reconstruction kernel that can be used to convert the input image I into a continuous image and $\mathcal{K}_A$ is an anti-aliasing kernel that can be applied to a continuous output image. It should be noted that the reconstruction kernel $\mathcal{K}_R$ and the anti-aliasing kernel $\mathcal{K}_A$ can be combined into a single kernel $\mathcal{K}_W$ that can be applied to input image I directly. The warping function defines the input image location where the kernel is applied, as well as the offsets used for the kernel weight computations. By modeling a down-scaling process in this manner, a complex, spatially varying kernel map $\mathcal{K}_W$, shown as the degradation map 202, can be generated by combining two simple, non-spatially varying kernels $\mathcal{K}_R$ and $\mathcal{K}_A$ with a warp W.

Given an image (e.g., the image 204) and a degradation map (e.g., the degradation map 202), the feature extraction module 206 generates features based on the input image 204 and the degradation map 202. In some embodiments, the feature extraction module 206 receives, as input, a concatenation of the input image 204 and the degradation map 202, and the feature extraction module 206 determines a set of features that is an encoding of features of the input image 204 as altered by the degradation map 202. The features generated by the feature extraction module 206 can be at a same resolution as the input image 204 in some embodiments. In some embodiments, the feature extraction module 206 includes one or more layers of a neural network. In such cases, the feature can include one or more convolution layers and one or more nonlinearity layers in some embodiments.

The resampling module 208 performs a resampling operation that warps the features output by the feature extraction module 206 based on the warp grid 212. For example, the resampling module 208 can resample the features to a higher resolution grid according to the warp grid 212. In some embodiments, the resampling module 208 includes one or more layers of a neural network. In such cases, the resampling module 208 can include one or more convolution layers and one or more nonlinearity layers in some embodiments. The warp grid 212 indicates how the input image 204 should be distorted at every point to generate the output image 214. In some embodiments, the warp grid 212 maps the coordinate of each pixel in the output image 214 to be generated to a corresponding coordinate in the input image 204. In such cases, the warp grid 212 can correspond to any technically feasible transformation operation, such as an upscaling, an affine transform, a lensing transform, or a delensing transform. For example, the warp grid 212 for a lensing transformation operation that adds spherical warping to the input image 204 could indicate, for each coordinate of one or more pixels in the output image 214, a corresponding coordinate of one or more pixels in the input image 204 before the spherical warping. Using the warp grid 212, the resampling module 208 resamples the features output by the feature extraction module 206. In some embodiments, the resampling module 208 includes one or more layers of a neural network. Illustratively, the resampling module 208 receives, as inputs, (1) the features output by the feature extraction module 206, and (2) the warp grid 212. The resampling module 208 resamples the features output by the feature extraction module 206 based on the warp grid 212 to determine a set of warped features. In some embodiments, each warped feature includes (1) features output by the feature extraction module 206 that are closest to a location in the input image 204 corresponding to a location in the output image based on the warp grid 212, and (2) associated geometric information that can include an offset and a local Jacobian matrix, as discussed in greater detail below in conjunction with FIG. 3.

More formally, sampling a lower resolution image can be parameterized with the reconstruction kernel $\mathcal{K}_R$, the warp W, and the anti-aliasing kernel $\mathcal{K}_A$. As described, the reconstruction kernel $\mathcal{K}_R$, the warp W, and the anti-aliasing kernel $\mathcal{K}_A$ can be combined into a resampling kernel map $\mathcal{K}_W$ that, when applied to an image I, produces a transformed lower resolution image I'. As described, such a kernel map $\mathcal{K}_W$ is a key additional input to the resampling model 150, shown as the degradation map 202 that is input into the resampling model 150. Specifically, given the input image I', the objective is to resample the input image I' according to the warp W. The warp W can be expressed as a 2D map of the same resolution as an output image I' (e.g., output image 214) and indicates the sampling position in the input image I' for every output pixel location. Such a map, which is also referred to herein as a warp grid $G_{W^{-1}}$ (shown as warp grid 212), can allow a wide range of transforms. In some embodiments, the resampling model 150 first uses a multi-layer perception (MLP) to reduce a dimensionality of the kernel map $\mathcal{K}_W$. Then, the input image I' and the encoded kernel map are concatenated and processed by the feature extraction module 206, which can be a Pro-SR network in some embodiments, to extract features. Thereafter, the resampling module 208 uses the warp grid $G_{W^{-1}}$ to resample the extracted features. Note that the inverse warp $W^{-1}$ maps coordinates in the output image 214 to corresponding locations in the input image 204. The resampling module 208 can produce two outputs in some embodiments. First, for each sampling location in the warp grid $G_{W^{-1}}$, the resampling module 208 can gather the extracted features in a 3×3 neighborhood around the closest feature. Second, the resampling module 208 can compute geometric information about the warp for each sampling location in the warp grid $G_{W^{-1}}$. In some embodiments, the geometric information includes the offset to the closest feature and a local Jacobian matrix that indicates a linear approximation of how the transformation operation indicated by the warp grid 212 alters the features output by the feature extraction module 206, as discussed in greater detail below in conjunction with FIG. 3.

Given the warped features and associated geometric information that are output by the resampling module 208, the prediction module 210 generates an output image 214. In some embodiments, the prediction module 210 generates one or more channels, such as a red color channel, a green color channel, and a blue color channel. In such cases, the resampling model 150 can combine the one or more color channels to generate the output image 214.

Although the degradation map 202 is shown as being input into the feature extraction module 206 for illustrative purposes, in practical applications, the degradation map 202 may be unknown and need to be estimated. As described, in some embodiments, the degradation map 202 can be estimated using an optimization procedure and a trained machine learning model that identifies artifacts created by degradation maps. Notably, using the incorrect degradation map 202, $\mathcal{K}_W$ can produce images that are either blurry or contain artifacts, such as ringing. Building on this observation, in some embodiments, a neural network can be trained that predicts the difference between the output with a random degradation map $\mathcal{K}_W$ and the result with the correct kernel $\mathcal{K}_{W_{GT}}$:

$$\mathcal{F}_E(\mathcal{F}, \mathcal{K}_W, I') = |F(I', \mathcal{K}_{W_{GT}}) - F(I', \mathcal{K}_W)|, \quad (4)$$

where $\mathcal{F}_E$ is the error prediction model and $\mathcal{F}$ is the resampling model 150. Once the error prediction neural network is trained, the error prediction can be used to determine the degradation map 202 at run time. In some embodiments, determining the degradation map 202 includes solving an optimization problem to optimize a kernel as follows:

$$\mathcal{K}_W^* = \underset{\mathcal{K}_W}{\operatorname{argmin}}\, \mathcal{F}_E(\mathcal{F}, \mathcal{K}_W, I') - \alpha|\mathcal{K}_R| - \beta|\mathcal{K}_A|, \quad (5)$$

where $|\mathcal{K}_R|$ and $|\mathcal{K}_A|$ refer to the size of $\mathcal{K}_R$ and $\mathcal{K}_A$, respectively, and $\alpha \geq 0$ and $\beta \geq 0$ are adjustable parameters. Among other things, equation (5) rewards larger kernels $\mathcal{K}_R$ and $\mathcal{K}_A$, which can result in sharper output images after resampling. Accordingly, equation (5) permits the sharpness to be controlled using the weights $\alpha$ and $\beta$ applied to the kernels $\mathcal{K}_R$ and $\mathcal{K}_A$. It should be noted that the sharpness of the output of the resampling model 150 can also be adjusted by modifying the degradation map provided as input.

Figure 3:
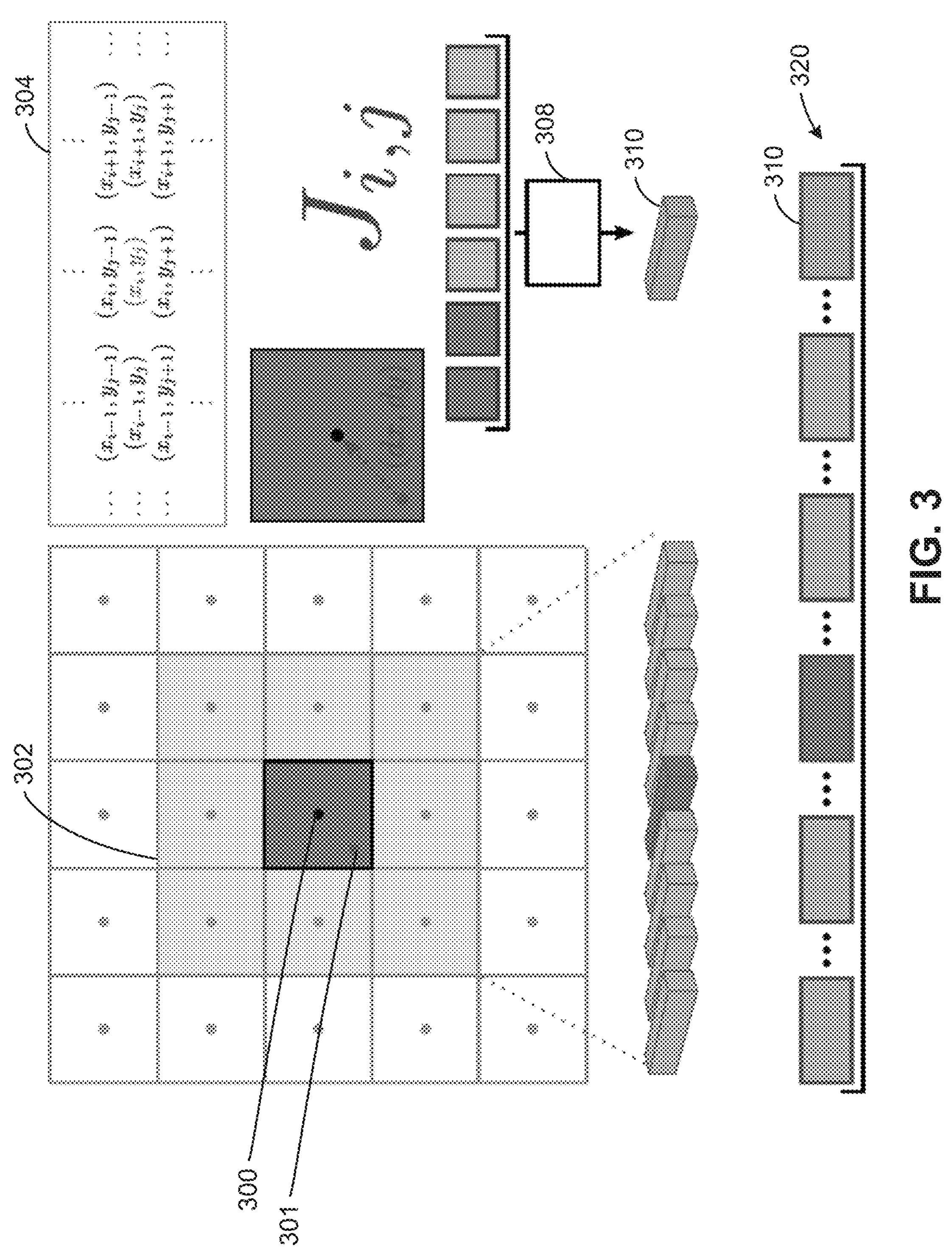
FIG. 3 illustrates how the resampling model of FIG. 1 computes warped features, according to various embodiments.

FIG. 3 illustrates how the resampling module 208 of the resampling model 150 computes warped features in a higher resolution grid, according to various embodiments. As shown, for each pixel in the output image 214, the resampling module 208 applies the warp grid 304 to compute a location in the input image 204, shown as location 301, that corresponds to the pixel. The resampling module 208 then generates a warped feature 320 that includes (1) features output by the feature extraction module 206 that are closest to the computed location in the input image 204, and (2) associated geometric information 310. In some embodiments, to determine the closest features, the resampling module 208 determines a closest pixel 300 to the location 301 and selects features in a neighborhood 302 around the pixel 300. In some embodiments, the geometric information 310 includes the sampling offset, which is a distance between the location 301 and the closest pixel 300, and a Jacobian matrix that indicates a linear approximation of how the transformation indicated by the warp grid 212 alters the features in the neighborhood 302, i.e., the local distortion. In some embodiments, the sampling offset is a vector pointing from an output pixel coordinate in the input image to the coordinate of a nearest feature, giving a two-dimensional (2D) vector $(d_x, d_y)$ that describes the warped features sub-pixel location in the input image. To provide information about the local distortion, in some embodiments, the Jacobian matrix can be computed using simple central differencing. Such a computation can produce a 2×2 Jacobian matrix describing the local deformation for each output location. In some embodiments, the sampling offsets and flattened local Jacobian matrices can be concatenated along the channel dimension and fed to a MLP 308. In addition, an output of the MLP 308 can be concatenated with the warped features along the channel dimension to generate the warped feature 320.

Figure 4:
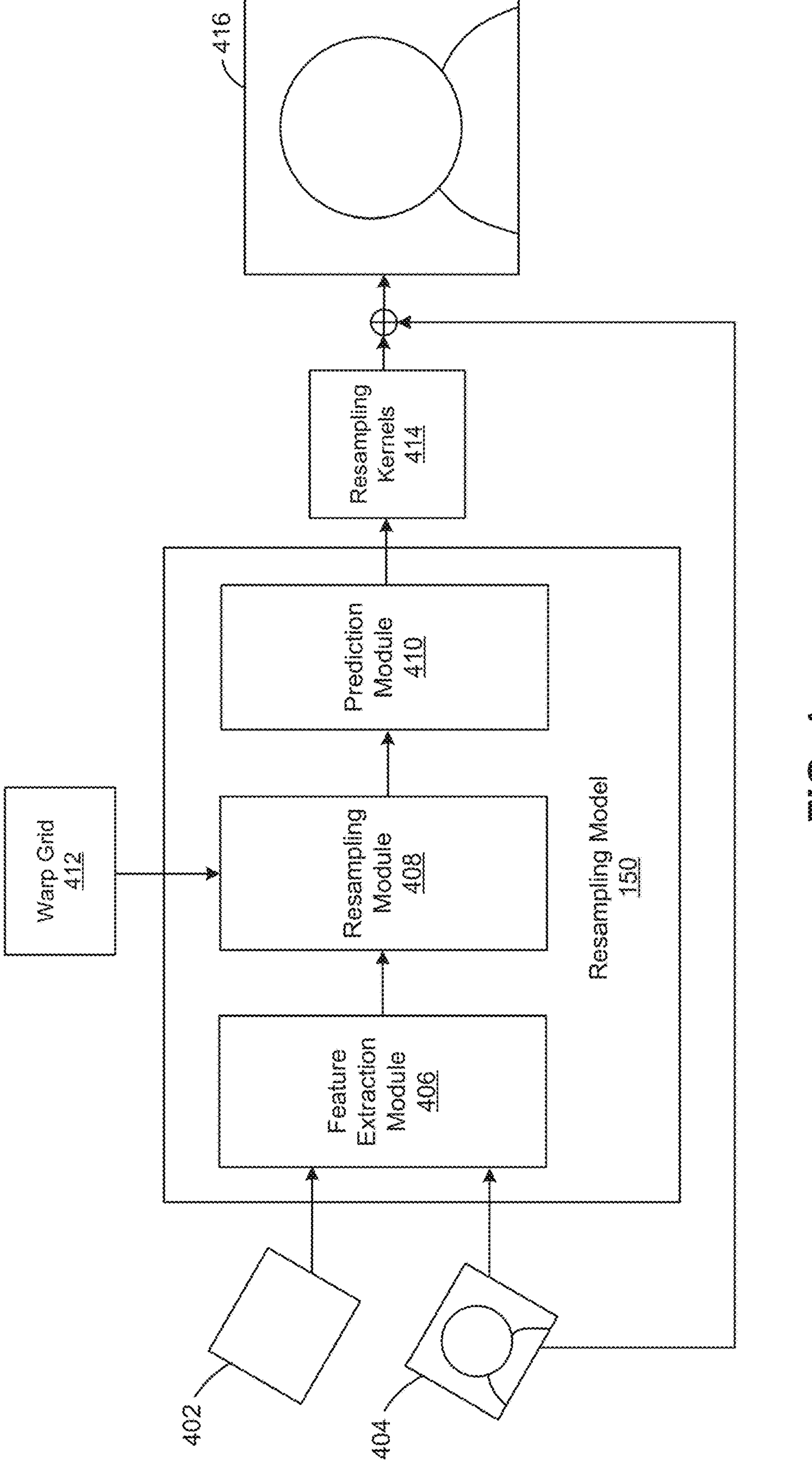
FIG. 4 illustrates in greater detail the resampling model of FIG. 1, according to various other embodiments.

FIG. 4 illustrates in greater detail the resampling model 150 of FIG. 1, according to various other embodiments. As shown, the resampling model 150 is a machine learning model that includes a feature extraction module 406, a resampling module 408, and a prediction module 410. The feature extraction module 406 and the resampling module 408 are similar to the feature extraction module 206 and the resampling module 208, respectively, described above in conjunction with FIG. 2. Illustratively, the resampling model 150 takes as inputs an image 404, a degradation map 402, and a warp grid 412. Rather than an output image, the prediction module 410 is configured to generate resampling kernels 414, which can be applied via local kernel convolutions to the input image 404 to generate an output image 416. Advantageously, resampling kernels (e.g., resampling kernels 414) can be used to resample data types other than the data types used to train the resampling model 150. For example, the resampling kernels could be applied to alpha masks, normal maps, depth maps, etc. even if the resampling model 150 was only trained using RGB images.

That is, in some embodiments, the prediction module of a resampling model can either produce an output image directly, as described above in conjunction with FIG. 2, or kernels that can be applied to an input image to generate an output image. In some embodiments, a MLP can be used for the prediction module 410. For example, the MLP could produce a 5×5 kernel for each output location. In such a case, the 5×5 kernel can then be applied to the 5×5 neighborhood around the closest pixel in the input image. Note that per output location, only a single kernel can be predicted. In some embodiments, the predicted kernel can be applied to all channels in the input image, which permits generalization to input channels that were not seen during training of the resampling model 150, such as alpha, depth, normal, etc.

Figure 5:
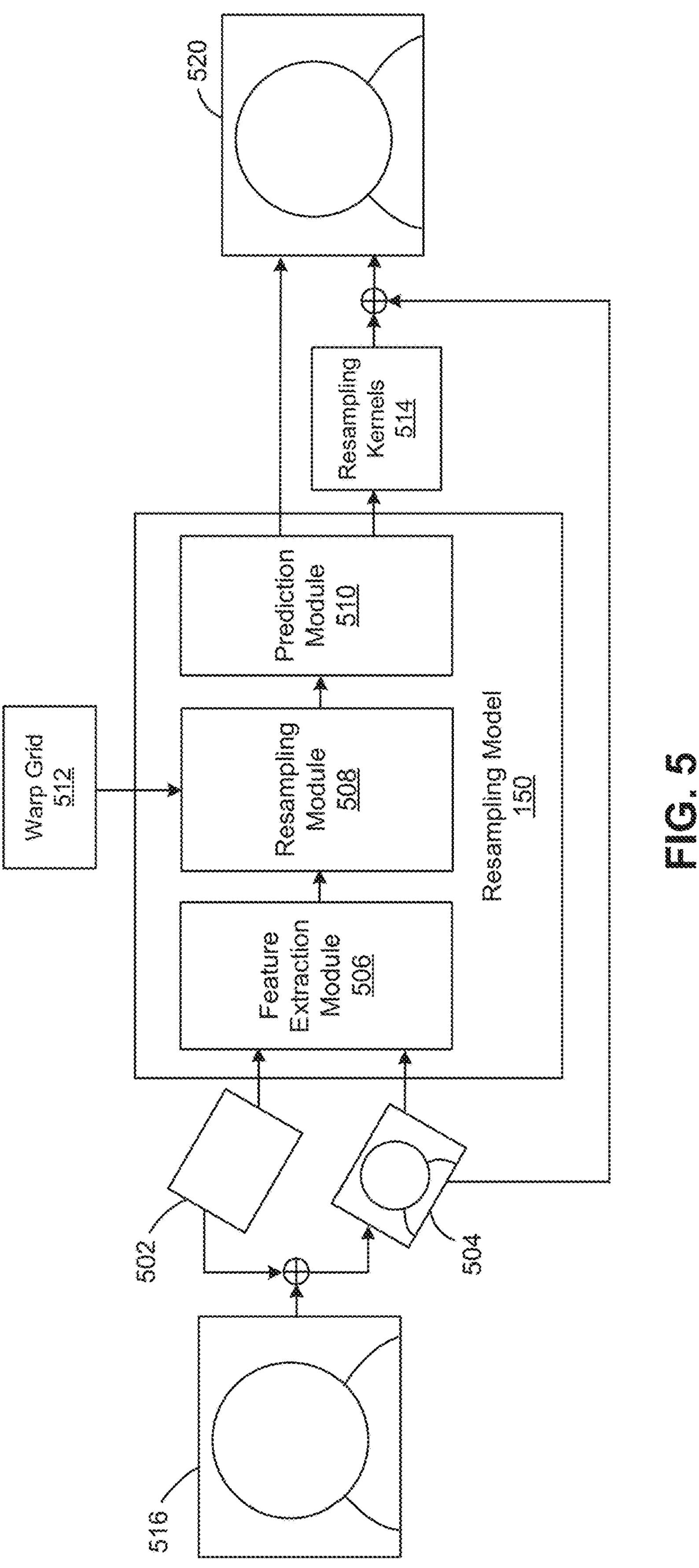
FIG. 5 illustrates how the resampling model of FIG. 1 can be trained, according to various embodiments.

FIG. 5 illustrates how the resampling model 150 of FIG. 1 can be trained, according to various embodiments. As shown, the resampling model 150 is a machine learning model that includes a feature extraction module 506, a resampling module 508, and a prediction module 510, which in some embodiments can be similar to the feature extraction module 206, the resampling module 208, and the prediction module 210, respectively, described above in conjunction with FIG. 2 or the feature extraction module 406, the resampling module 408, and the prediction module 410, respectively, described above in conjunction with FIG. 4. The model trainer 116 trains the resampling model 150 based on a training data set that includes input images and output images that are resampled versions of the input images. In some embodiments, the model trainer 116 generates the input images from the output images. Illustratively, for a given output image 516, the model trainer 116 can generate a corresponding input image 504 that is used, along with the output image 516, to train the resampling model 150. For example, the model trainer 116 applies a degradation map 502 to the output image 516 to generate the input image 504.

During training, the model trainer 116 processes the training input image (e.g., input image 504) and the degradation map of each training data sample using the feature extraction module 506 to determine a set of features, and the model trainer 116 further processes the set of features output by the feature extraction module 506 and the warp grid 512 using module 508 to determine a set of warped features. The model trainer 116 further processes the set of warped features using the prediction module 510 to generate a predicted output image (e.g., output image 520) or resampling kernels (shown as resampling kernels 514) that can be applied to the input image to generate the output image. Thereafter, the model trainer 116 compares the predicted output image (e.g., output image 520) with the output image of the training data sample (e.g., output image 516) to compute a loss that is a difference between and the output image of the training data sample, and the model trainer 116 updates one or more parameters of the resampling model 150 based on the loss, such that the predicted output images generated by the updated resampling model 150 are closer to the output image of the training data sample. In some embodiments, the model trainer 116 can perform any technically feasible training algorithm, such as backpropagation with gradient descent. The model trainer 116 trains resampling model 150 using the training data samples of the training data set until the predicted output image generated by the resampling model 150 for one or more training data samples is within an acceptable threshold of the corresponding output images of the one or more training data samples.

Figure 6:
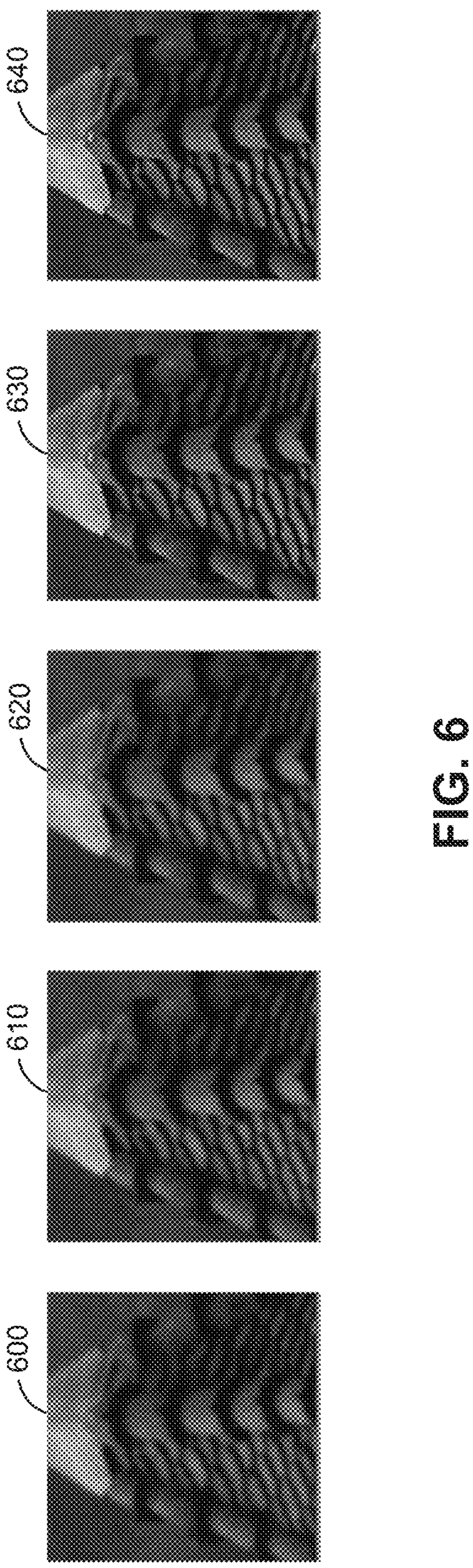
FIG. 6 illustrates exemplar images generated by upscaling an image, according to various embodiments.

FIG. 6 illustrates exemplar images generated by upscaling an input image, according to various embodiments. As shown, image 630 was generated by inputting a low-resolution image (not shown) into the resampling model 150 described above in conjunction with FIG. 2, which output the image 630. Image 640 was generated by inputting the low-resolution image into the resampling model 150 described above in conjunction with FIG. 4, which output resampling kernels that were applied to the low-resolution image to generate the image 640. In addition, images 600, 610, and 620 were generated by applying a conventional bilinear interpolation technique, the conventional local implicit image function (LIIF) technique, and the conventional SRWarp technique, respectively to upscale the low-resolution image. Illustratively, the images 630 and 640 have better overall visual quality than the images 600, 610, and 620 generated using conventional techniques.

Figure 7B:
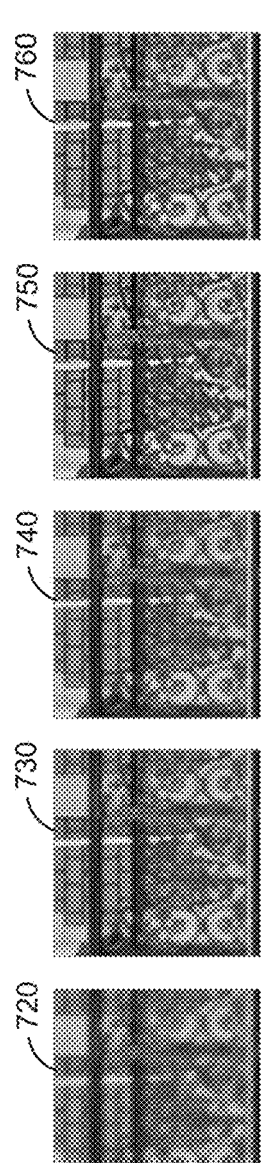
FIG. 7B illustrates exemplar image regions of a rectified image generated using different techniques, according to various embodiments.
Figure 7A:
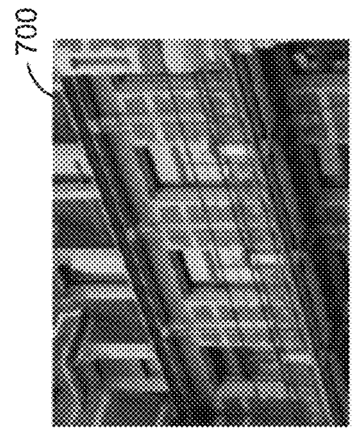
FIG. 7A illustrates an exemplar rectified image generated by rectifying an image, according to various embodiments.
Figure 7A:
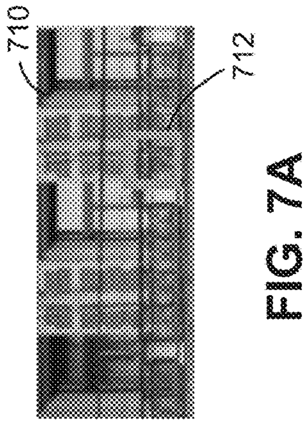

FIG. 7A illustrates an exemplar rectified image generated by rectifying an image, according to various embodiments. As shown, an image 700 can be resampled, such as by inputting the image 700 into the resampling model 150, to generate a rectified image 710 including an image region 712.

FIG. 7B illustrates exemplar image regions of a rectified image generated using different techniques, according to various embodiments. As shown, image regions 720, 730, 740, 750, and 760 correspond to the image region 712 of the rectified image 710, described above in conjunction with FIG. 7A. The image region 750 was generated by inputting the image 700 into the resampling model 150 described above in conjunction with FIG. 2, which output a rectified image that includes the image region 750. The image region 760 was generated by inputting the image 700 into the resampling model 150 described above in conjunction with FIG. 4, which output resampling kernels that were applied to the image 700 to generate a rectified image that includes the image region 760. In addition, image regions 720, 730, and 740 are from images generated by applying a conventional bilinear interpolation technique, the conventional LIIF technique, and the conventional SRWarp technique, respectively, to rectify the image 700. Illustratively, the image regions 750 and 760 generated using the resampling model 150 have better overall visual quality, including less blurriness, relative to the image regions 720, 730, and 740 generated using conventional techniques.

Figure 8:
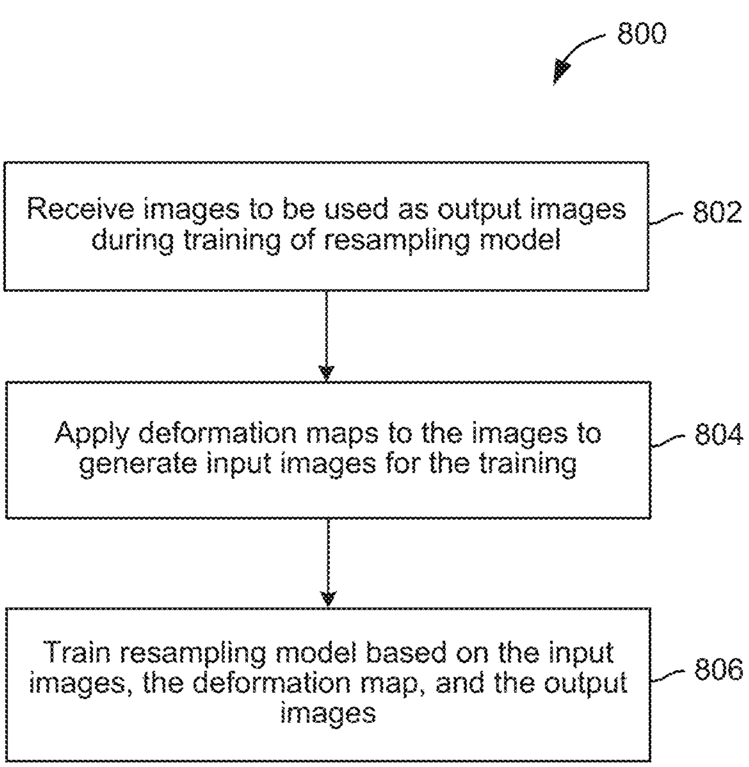
FIG. 8 sets forth a flow diagram of method steps for training a resampling model, according to various embodiments.

FIG. 8 sets forth a flow diagram of method steps for training a resampling model, according to various embodiments. Although the method steps are described in conjunction with the system of FIG. 1, persons of ordinary skill in the art will understand that any system configured to perform the method steps, in any order, is within the scope of the present disclosure.

As shown, a method 800 begins at step 802, where the model trainer 116 receives images to be used as output images during training of a resampling model.

At step 804, the model trainer 116 applies deformation maps to the images to generate input images for the training. The deformation maps can be generated in any technically feasible manner in some embodiments. In some embodiments, the model trainer 116 can determine the deformation maps from a warp grid, as described above in conjunction with FIG. 2.

At step 806, the model trainer 116 trains the resampling model based on the input images, the deformation maps, and the output images. The model trainer 116 can train the resampling model in any technically feasible manner in some embodiments, such as using backpropagation with gradient descent to update parameters of the resampling model, as described above in conjunction with FIG. 5.

Figure 9:
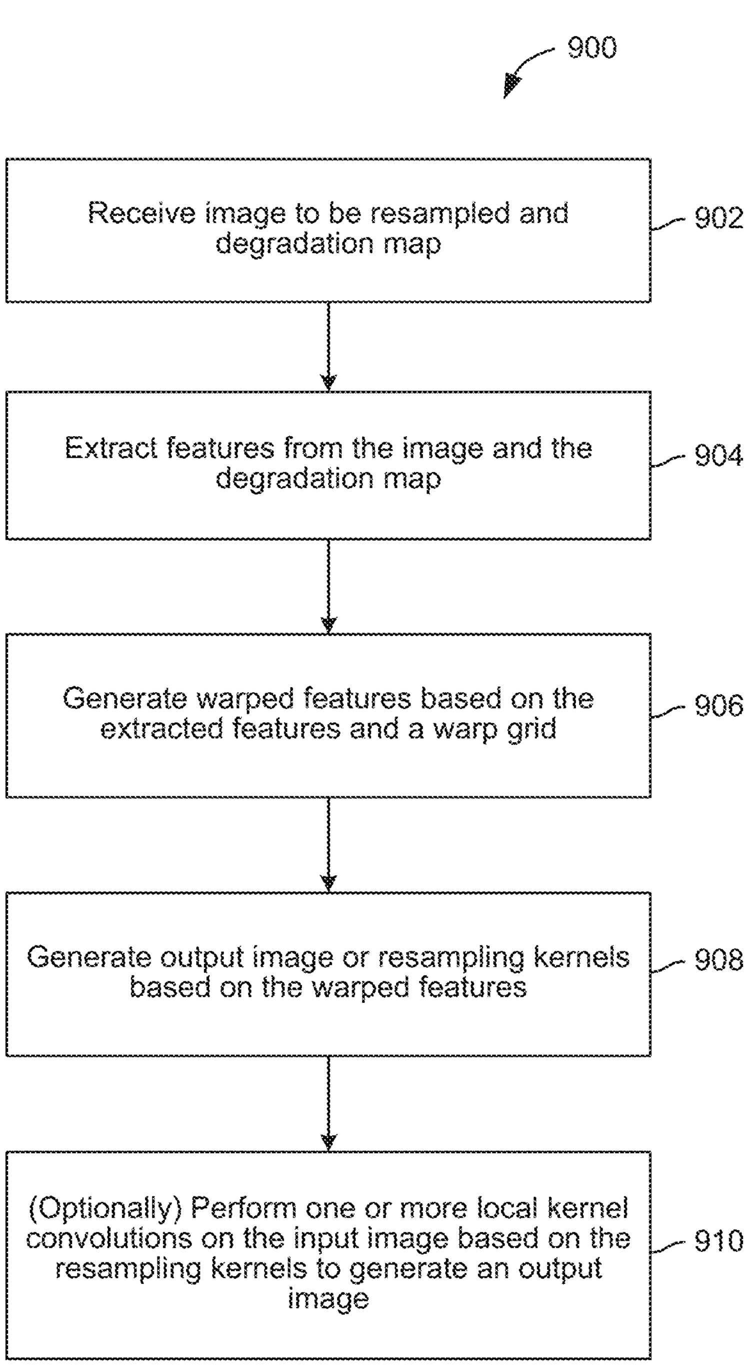
FIG. 9 sets forth a flow diagram of method steps for resampling an image, according to various embodiments.

FIG. 9 sets forth a flow diagram of method steps for resampling an image, according to various embodiments. Although the method steps are described in conjunction with the system of FIG. 1, persons of ordinary skill in the art will understand that any system configured to perform the method steps, in any order, is within the scope of the present disclosure.

As shown, a method 900 begins at step 902, where the image resampling application 146 receives an image to be resampled and a degradation map. In some embodiments, the image resampling application 146 can generate the degradation map 202 using an optimization procedure and a trained machine learning model that identifies artifacts created by degradation maps.

At step 904, the image resampling application 146 extracts features from the image and the degradation map. In some embodiments, the image resampling application 146 inputs the image and the degradation map into a trained resampling model (e.g., resampling model 150). In such cases, the resampling model can include a feature extraction module that outputs features given the image and the degradation map.

At step 906, the image resampling application 146 generates warped features based on the extracted features and a warp grid. In some embodiments, a resampling model (e.g., resampling model 150) can include a resampling module that, given features output by a feature extraction module, generates warped features, including associated geometric information, according to the techniques described above in conjunction with FIG. 3.

At step 908, the image resampling application 146 generates an output image or resampling kernels based on the warped features, which can be included in a warped feature map in some embodiments. In some embodiments, a resampling model (e.g., resampling model 150) can include a prediction module that outputs an image or resampling kernels given the warped features generated by a resampling module.

At (optional) step 910, assuming resampling kernels were generated at step 908, the image resampling application 146 performs one or more local kernel convolutions on the input image, received at step 902, based on the resampling kernels to generate an output image.

In sum, techniques are disclosed for resampling images. In some embodiments, a resampling model includes (1) one or more feature extraction layers that extract features from an input image and a degradation map; (2) one or more resampling layers that generate warped features from the extracted features and a warp grid; and (3) one or more prediction layers that generate, from the warped features, an output image or resampling kernels that can be applied to the input image to generate an output image. In some embodiments, the resampling model can be trained by applying degradation maps to output images in a training data set to generate corresponding input images, and training the resampling model using the input images and the corresponding output images.

At least one technical advantage of the disclosed techniques relative to the prior art is the disclosed techniques can generate resampled images having better overall visual quality than resampled images that can be generated using conventional resampling techniques. In addition, the disclosed techniques can generate resampling kernels that can be used to resample data types other than the data types used to train a resampling model. These technical advantages represent one or more technological improvements over prior art approaches.

1. In some embodiments, a computer-implemented method for resampling images comprises extracting one or more features from an input image and a degradation map, determining, based on the one or more features and a warp grid that maps one or more coordinates of one or more pixels in an output image to one or more corresponding coordinates in the input image, one or more warped features, and generating at least one of the output image or one or more resampling kernels based on the one or more warped features.
2. The computer-implemented method of clause 1, wherein determining the one or more warped features comprises, for each pixel of the output image determining a location in the input image that corresponds to the pixel based on the warp grid, determining at least one of the one or more features to include in the warped feature based on proximity of the at least one of the one or more features to the location in the input image, and determining geometric information associated with the at least one of the one or more features.
3. The computer-implemented method of clauses 1 or 2, wherein determining the one or more warped features comprises performing one or more resampling operations based on the warp grid to warp the one or more features.
4. The computer-implemented method of any of clauses 1-3, wherein each of the extracting, determining, and generating steps is performed by one or more layers of a machine learning model.
5. The computer-implemented method of any of clauses 1-4, further comprising generating one or more training input images based on one or more training output images and one or more degradation maps, and performing one or more operations to train the machine learning model based on the one or more training input images and the one or more training output images.
6. The computer-implemented method of any of clauses 1-5, further comprising generating the degradation map based on the input image.
7. The computer-implemented method of any of clauses 1-6, wherein the degradation map is generated by performing one or more optimization operations using a trained machine learning model.
8. The computer-implemented method of any of clauses 1-7, wherein the one or more resampling kernels are generated, and the method further comprises performing one or more local kernel convolutions on the input image based on the one or more resampling kernels.
9. The computer-implemented method of any of clauses 1-8, wherein the output image is generated, and generating the output image comprises predicting a plurality of channels of the output image based on the one or more warped features, and combining the plurality of channels to generate the output image.
10. In some embodiments, one or more non-transitory computer-readable storage media include instructions that, when executed by one or more processing units, cause the one or more processing units to perform steps for resampling images, the steps comprising extracting one or more features from an input image and a degradation map, determining, based on the one or more features and a warp grid that maps one or more coordinates of one or more pixels in an output image to one or more corresponding coordinates in the input image, one or more warped features, and generating at least one of the output image or one or more resampling kernels based on the one or more warped features.
11. The one or more non-transitory computer-readable storage media of clause 10, wherein determining the one or more warped features comprises, for each pixel of the output image determining a location in the input image that corresponds to the pixel based on the warp grid, determining at least one of the one or more features to include in the warped feature based on proximity of the at least one of the one or more features to the location in the input image, and determining geometric information associated with the at least one of the one or more features.
12. The one or more non-transitory computer-readable storage media of clauses 10 or 11, wherein determining the one or more warped features comprises performing one or more resampling operations based on the warp grid to warp the one or more features.
13. The one or more non-transitory computer-readable storage media of any of clauses 10-12, wherein each of the extracting, determining, and generating steps is performed by one or more layers of a machine learning model.
14. The one or more non-transitory computer-readable storage media of any of clauses 10-13, wherein the instructions, when executed by the one or more processing units, further cause the one or more processing units to perform the steps of generating one or more training input images based on one or more training output images and one or more degradation maps, and performing one or more operations to train the machine learning model based on the one or more training input images and the one or more training output images.
15. The one or more non-transitory computer-readable storage media of any of clauses 10-14, wherein the instructions, when executed by the one or more processing units, further cause the one or more processing units to perform the step of generating the degradation map based on the input image.
16. The one or more non-transitory computer-readable storage media of any of clauses 10-15, wherein the degradation map is generated by performing one or more optimization operations using a trained machine learning model.
17. The one or more non-transitory computer-readable storage media of any of clauses 10-16, wherein the one or more resampling kernels are generated, and the instructions, when executed by the one or more processing units, further cause the one or more processing units to perform the step of performing one or more local kernel convolutions on the input image based on the one or more resampling kernels.

18. In some embodiments, a computer-implemented method of training a resampling model to generate resampled images comprises generating one or more warped images based on one or more images and a degradation map, and performing one or more operations to train the resampling model based on the one or more images and the one or more warped images.

19. The computer-implemented method of clause 18, wherein the resampling model is trained to take as inputs an input image and a degradation map and to output at least one of an output image or one or more resampling kernels.

20. The computer-implemented method of clauses 18 or 19, wherein the resampling model is an artificial neural network that comprises one or more layers configured to extract one or more features from an input image and a degradation map, one or more layers configured to determine, based on the one or more features and a warp grid, one or more warped features, and one or more layers configured to generate at least one of an output image or one or more resampling kernels based on the one or more warped features.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method for resampling images, the method comprising:

extracting one or more features from (i) an input image and (ii) a degradation map that indicates per-pixel blurring within the input image;

determining, based on the one or more features and a warp grid that maps one or more coordinates of one or more pixels in an output image to one or more corresponding coordinates in the input image, one or more warped features; and generating at least one of the output image or one or more resampling kernels based on the one or more warped features.

2. The computer-implemented method of claim 1, wherein determining the one or more warped features comprises, for each pixel of the output image:

determining a location in the input image that corresponds to the pixel based on the warp grid;

determining at least one of the one or more features to include in the warped feature based on proximity of the at least one of the one or more features to the location in the input image; and determining geometric information associated with the at least one of the one or more features.

3. The computer-implemented method of claim 1, wherein determining the one or more warped features comprises performing one or more resampling operations based on the warp grid to warp the one or more features.

4. The computer-implemented method of claim 1, wherein each of the extracting, determining, and generating steps is performed by one or more layers of a machine learning model.

5. The computer-implemented method of claim 4, further comprising:

generating one or more training input images based on one or more training output images and one or more degradation maps; and performing one or more operations to train the machine learning model based on the one or more training input images and the one or more training output images.

6. The computer-implemented method of claim 1, further comprising generating the degradation map based on the input image.

7. The computer-implemented method of claim 6, wherein the degradation map is generated by performing one or more optimization operations using a trained machine learning model.

8. The computer-implemented method of claim 1, wherein the one or more resampling kernels are generated, and the method further comprises performing one or more local kernel convolutions on the input image based on the one or more resampling kernels.

9. The computer-implemented method of claim 1, wherein the output image is generated, and generating the output image comprises:

predicting a plurality of channels of the output image based on the one or more warped features; and combining the plurality of channels to generate the output image.

10. One or more non-transitory computer-readable storage media including instructions that, when executed by one or more processing units, cause the one or more processing units to perform steps for resampling images, the steps comprising:

extracting one or more features from (i) an input image and (ii) a degradation map that indicates per-pixel blurring within the input image;

determining, based on the one or more features and a warp grid that maps one or more coordinates of one or more pixels in an output image to one or more corresponding coordinates in the input image, one or more warped features; and generating at least one of the output image or one or more resampling kernels based on the one or more warped features.

11. The one or more non-transitory computer-readable storage media of claim 10, wherein determining the one or more warped features comprises, for each pixel of the output image:

determining a location in the input image that corresponds to the pixel based on the warp grid;

determining at least one of the one or more features to include in the warped feature based on proximity of the at least one of the one or more features to the location in the input image; and determining geometric information associated with the at least one of the one or more features.

12. The one or more non-transitory computer-readable storage media of claim 10, wherein determining the one or more warped features comprises performing one or more resampling operations based on the warp grid to warp the one or more features.

13. The one or more non-transitory computer-readable storage media of claim 10, wherein each of the extracting, determining, and generating steps is performed by one or more layers of a machine learning model.

14. The one or more non-transitory computer-readable storage media of claim 13, wherein the instructions, when executed by the one or more processing units, further cause the one or more processing units to perform the steps of:

generating one or more training input images based on one or more training output images and one or more degradation maps; and performing one or more operations to train the machine learning model based on the one or more training input images and the one or more training output images.

15. The one or more non-transitory computer-readable storage media of claim 10, wherein the instructions, when executed by the one or more processing units, further cause the one or more processing units to perform the step of generating the degradation map based on the input image.

16. The one or more non-transitory computer-readable storage media of claim 15, wherein the degradation map is generated by performing one or more optimization operations using a trained machine learning model.

17. The one or more non-transitory computer-readable storage media of claim 10, wherein the one or more resampling kernels are generated, and the instructions, when executed by the one or more processing units, further cause the one or more processing units to perform the step of performing one or more local kernel convolutions on the input image based on the one or more resampling kernels.

* * * * *